B. D. KUNKLE.
ELECTRICAL SYSTEM FOR AUTOMOBILES.
APPLICATION FILED APR. 12, 1915. RENEWED SEPT. 9, 1920.
1,374,586.
Patented Apr. 12, 1921.
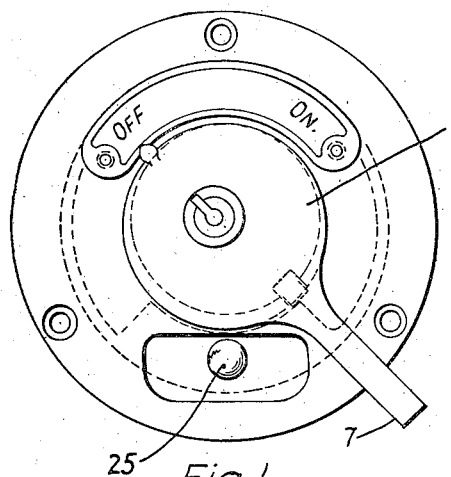
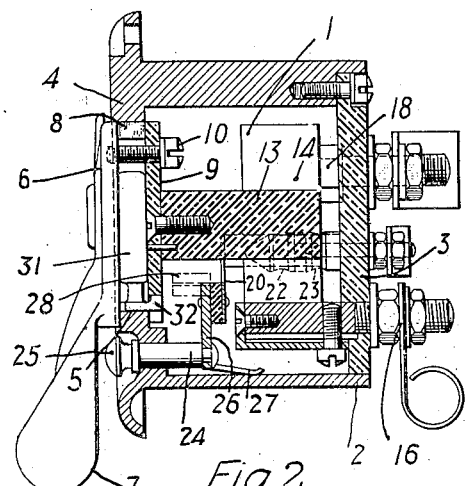
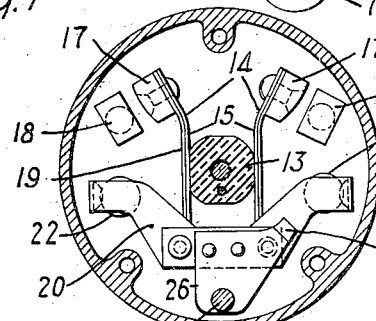
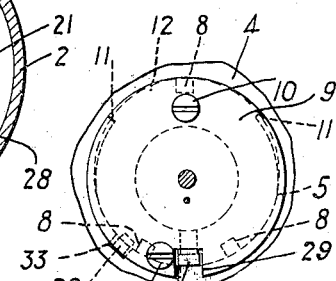
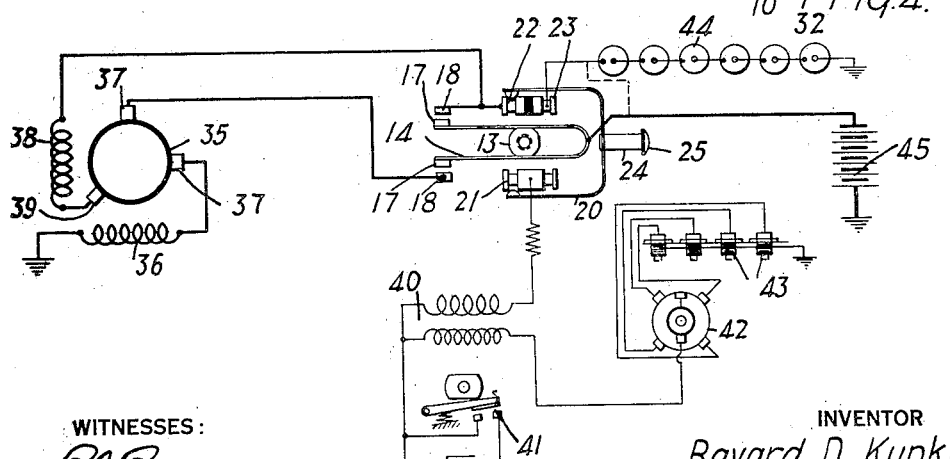
WITNESSES:
INVENTOR
Bayard D. Kunkle.
BY
ATTORNEY

UNITED STATES PATENT OFFICE.

BAYARD D. KUNKLE, OF WILKINSBURG, PENNSYLVANIA, ASSIGNOR TO WESTING-HOUSE ELECTRIC AND MANUFACTURING COMPANY, A CORPORATION OF PENNSYLVANIA.

ELECTRICAL SYSTEM FOR AUTOMOBILES.

1,374,586.  Specification of Letters Patent.  Patented Apr. 12, 1921.

Application filed April 12, 1915, Serial No. 20,758. Renewed September 9, 1920. Serial No. 409,287.

*To all whom it may concern:*

Be it known that I, BAYARD D. KUNKLE, a citizen of the United States, and a resident of Wilkinsburg, in the county of Allegheny and State of Pennsylvania, have invented a new and useful Improvement in Electrical Systems for Automobiles, of which the following is a specification.

My invention relates to electrical systems that are employed in connection with motor vehicles, and it has for its object to provide a simple and convenient means for controlling the circuits of electrical systems for starting gas engines and for furnishing current for lighting and ignition purposes and for charging storage batteries.

In the operation of a motor vehicle that is provided with a dynamo-electric machine having a permanent connection to the engine shaft and which supplies current for ignition purposes, it may occur that the engine cannot be started by the dynamo-electric machine and that the storage battery may be fully discharged during attempts to start the engine. In case it becomes necessary to start the engine by the usual hand crank, it is desirable to provide a means for enabling the operator either to obtain current for ignition purposes from the battery after disconnecting the dynamo-electric machine therefrom or to employ a second source of current for the ignition circuit. It is also desirable, in case the battery becomes fully charged, to open the charging circuit without disconnecting the ignition circuit from its source of current.

My invention comprises a dynamo-electric machine which operates as a motor to start a gas engine and is then operated by the engine as a generator to furnish current for the purposes above noted. The system comprises, further, a switching mechanism for controlling the electrical connection of the field-magnet windings of the dynamo-electric machine to a storage battery and of an ignition circuit to one of several sources of current. The ignition circuit is connected either to the main circuit of the dynamo-electric machine which comprises a battery or directly to the battery or a second source of current, according to the position of a switch member that operates independently of a switch member for controlling the main circuit of the dynamo-electric machine. The movable switch members are so interlocked by mechanical means that either of them may be actuated only when the other is in its normal position. A single locking member operates to secure both switch members in their normal positions.

In the accompanying drawing, Figure 1 is a front view, in elevation, of a switching mechanism constructed in accordance with my invention. Fig. 2 is a view, in longitudinal section, of the mechanism of Fig. 1. Fig. 3 is a view, in transverse section, of the switching mechanism. Fig. 4 is a view, similar to Fig. 3, as viewed from the right in Fig. 2, parts being broken away. Fig. 5 is a diagrammatic view of circuits and apparatus embodying my invention.

Referring particularly to Figs. 1, 2, 3 and 4, a switching mechanism 1 comprises a cylindrical shell or outer casing 2 and a disk 3 of insulating material which closes the inner end of the casing. The outer end of the casing is provided with a flanged portion 4 having a substantially circular opening 5 which is closed by a metal disk 6 having an operating handle 7 integral therewith. The disk 6 is provided with inwardly extending lugs 8 which have a bearing on the inner surface of the opening 5 and which serve as spacing members to separate a disk 9 of insulating material from the disk 6 to which it is connected by suitable screws 10. The disks 6 and 9 are larger in diameter than the opening 5, and their longitudinal movement relatively to the casing 2 is thus prevented, while their rotative movement is limited by the upper of the lugs 8 and coacting shoulder portions 11 at the ends of a curved slot 12 which forms a part of the opening 5.

A substantially rectangular member 13 of insulating material, which is rigidly secured to the disk 9, extends longitudinally within the casing 2 and coacts with a movable switch member 14. The switch member 14 comprises a spring 15 of substantially U-shape which is rigidly secured, at its mid-portion, to a terminal member 16. The spring 15 carries, at each of its ends, contact members 17 which coact respectively with stationary contact members 18. The contact members 17 are connected to the terminal member 16 by a shunt conductor 19 which conforms, in shape, to the spring 15.

A second movable switch member, which is located in the lower portion of the switch casing, comprises a bridging contact member 20 to coact with stationary contact members 21, 22 and 23 that are rigidly secured to the insulating disk 3. The contact members 22 and 23, which are mounted in axial alinement, are insulated from each other. The position of the bridging contact member 20 is controlled by a rod 24 that extends through a suitable opening in the front of the casing and is provided with a suitable knurled head 25 to be grasped by the operator.

The rod 24 is connected to the contact member 20 by a member 26 that is insulated from the contact member 20 and is provided with a longitudinally extending portion 27 which has a bearing on the interior surface of the casing 2. The member 26 is further provided with a longitudinally extending arm 28 which coacts with a notch 29 in the disk 9 to constitute an interlock for controlling the operation of the two movable switch members. When the lever 7 is in its operative position, the notch 29 is not in alinement with the arm 28 and the disk 9 prevents the forward longitudinal movement of the arm 28 and its connected parts comprising the rod 24 and the contact member 20. When the rod 24 has been actuated forwardly to shift the position of the contact member 20, the arm 28 projects into the notch 29 to prevent rotation of the disk 9 and its connected parts. The actuation of either of the switch members from its normal position operates, therefore, to prevent actuation of the other member until the one has been returned to its normal position.

A lock 31 is mounted between the disks 6 and 9 and is provided with a bolt 32 which projects into the notch or recess 29 and registers with a notch 33 in the flange portion 4 when the handle 7 is in its "off" position. The notch 33 is also in axial alinement with the arm 28. It will be obvious, therefore, that, when the bolt 31 has been actuated to its outer position, within the notch 33, rotative movement of the lever 7 and longitudinal movement of the rod 24 are effectually prevented.

Reference may now be had to Fig. 5, in which the circuits and apparatus employed in connection with my invention are diagrammatically illustrated. A dynamo-electric machine 35, which operates as a motor to start a gas engine (not shown) and is operated by the engine as a generator after the latter has been started, has series field-magnet windings 36 that are in circuit with the main or working portions 37. The dynamo-electric machine has, also, shunt field-magnet windings 38 that are connected between one of the main brushes and an auxiliary brush 39 that is displaced from the main brushes by approximately 90 electrical degrees. The details of the dynamo-electric machine form no part of the present invention.

The main circuit of the dynamo-electric machine is controlled by the movable switch member 14 and the stationary contact members 18. An ignition circuit, which is normally connected to the main circuit of the dynamo-electric machine through the contact member 21, switch member 20 and contact member 22, comprises an induction coil 40, an interrupter 41, a distributer 42, and the usual spark plugs 43. A battery of dry cells 44 is connected to the contact member 23. If dry cells are not employed, the contact member 23 is connected directly to a storage battery 45, as indicated by dotted lines.

Normally, the switch member 20 connects the ignition circuit to the main circuit of the dynamo-electric machine 35. When it is desired to start the engine, the lever 7 is actuated in a clockwise direction, as viewed in Fig. 1. The member 13 then operates as a cam to separate the sides of the switch members 14 and thereby effect the engagement of the contact members 17 with the corresponding contact members 18. The series and shunt field windings of the dynamo-electric machine are thus simultaneously connected in circuit with the storage battery 45, and the dynamo-electric machine then operates as a motor to start the engine. During the operation as a motor, the series and shunt field windings assist each other to produce a strong magnetic force and thereby produce a relatively powerful torque. During the starting operation, the ignition circuit receives current from the battery 45 through the switch members 14 and 20.

When the engine starts under its own power and its speed has increased to a predetermined rate, the dynamo-electric machine 35 will generate an electromotive force that is higher than that of the battery, and the latter will be charged. When the dynamo-electric machine operates as a generator, current traverses the series field winding in the reverse direction and the field windings oppose each other. Since the auxiliary brush 39 is intermediate the main or working brushes, the potential difference between the terminals of the shunt or main field winding varies in accordance with the armature reaction. Since the armature reaction is proportional to the load, the dynamo-electric machine is inherently self-regulating and no regulating mechanism is required. The ignition circuit is now supplied with current directly from the dynamo-electric machine. To stop the engine, the lever 7 is actuated to its illustrated or "off" position to simultaneously open the circuits of the field windings. The ignition circuit then receives no current and the engine is brought to rest.

If it should be impossible, for any reason, to start the engine by employing the dynamo-electric machine 35 as a motor, and it becomes necessary to crank the engine manually, it is desirable to disconnect the dynamo-electric machine from the battery without rendering it impossible to obtain current for the ignition circuit. The lever 7 will, accordingly, be actuated to its "off" position to simultaneously open the circuit of the series and shunt field windings. The rod 24, which controls the switch member 20, will then be drawn outwardly to connect the battery of dry cells 44 to the ignition circuit. In case dry cells or a second source of current are not employed, the contact member 23 may be connected directly to the battery 45, as indicated by dotted lines in Fig. 5. The engine may then be started manually in the usual manner. It may be noted that it is possible for a battery to supply sufficient current for ignition purposes after it is so nearly discharged that it will supply insufficient current for motor operation.

It will be noted that I provide a simple and efficient means for simultaneously controlling the electrical connections of a dynamo-electric machine and of an ignition circuit. I further provide a simple means for use in case of emergencies to enable the operator to render the ignition circuit operative when the circuit of the dynamo-electric machine is broken. The latter means is of special advantage either in case it is impossible to start the engine by means of the dynamo-electric machine or in case it is desired to discontinue the charging of the battery. I provide also means for preventing the simultaneous connection of the ignition circuit to the main and auxiliary sources of current. A single locking means operates to secure both of the switch members in their respective normal positions.

I claim as my invention:

1. In an electrical system, the combination with a dynamo-electric machine, main and auxiliary sources of current and an ignition circuit, of means for controlling the connection of the main source in circuit with the dynamo-electric machine, means for controlling the connection of said ignition circuit either to said auxiliary source or to said dynamo-electric machine, and a single means for locking both of said controlling means in inoperative positions.

2. In an electrical system, the combination with a dynamo-electric machine, main and auxiliary sources of current and an ignition circuit, of means connecting said ignition circuit either to said auxiliary source or to said dynamo-electric machine, and means for connecting said main source to said dynamo-electric machine, and means whereby one of said connecting means is operable only when the other connecting means is in an inoperative position.

3. In an electrical system, the combination with a dynamo-electric machine, main and auxiliary sources of current and an ignition circuit, of means having a plurality of positions for controlling the connection of said main source to said dynamo-electric machine, means for controlling the connection of said ignition circuit either to said auxiliary source or to said dynamo-electric machine, and means for interlocking said controlling means.

4. In an electrical system, the combination with a main circuit comprising a dynamo-electric machine and a source of current, an ignition circuit, and a second source of current, of means for controlling the main circuit, means for controlling the connection of said ignition circuit either to said second source or to said main circuit, and means for rendering either of said controlling means inoperative when the other controlling means is in an operative position.

5. In an electrical system, the combination with a dynamo-electric machine, main and auxiliary sources of current and an ignition circuit, of a rotatable member controlling the connection of the main source in circuit with the dynamo-electric machine, and a reciprocable member for controlling the connection of said ignition circuit either to said auxiliary source or to said dynamo-electric machine.

6. In an electrical system, the combination with a dynamo-electric machine, main and auxiliary sources of current, and an ignition circuit, of means for connecting said ignition circuit either to said dynamo-electric machine or to said auxiliary source, and means for preventing the connection of said ignition circuit to said auxiliary source when the main source is in circuit with said dynamo-electric machine.

7. In an electrical system, the combination with a dynamo-electric machine, main and auxiliary sources of current, and an ignition circuit, of means for connecting said ignition circuit either to said dynamo-electric machine or to said auxiliary source, means for connecting the main source in circuit with said dynamo-electric machine, and means for preventing the completion of said circuit comprising said main source when the ignition circuit is connected to said auxiliary source.

8. In an electrical system, the combination with a plurality of electrical circuits, of a reciprocable member for controlling one of said circuits, a rotatable cam member for controlling another of said circuits and means for preventing the simultaneous operation of said members.

9. An electrical system comprising a dynamo-electric machine, a storage battery, an ignition circuit, switching mechanism for connecting the storage battery and the ignition circuit to the dynamo-electric machine, means for connecting the ignition circuit for energization independently of the dynamo-electric machine, and interlocking means for preventing simultaneous operation of the switching mechanism and the said means to respectively perform their aforesaid functions.

In testimony whereof, I have hereunto subscribed my name this 31st day of March, 1915.

BAYARD D. KUNKLE.